US011933469B2

(12) United States Patent
Ndiaye et al.

(10) Patent No.: US 11,933,469 B2
(45) Date of Patent: Mar. 19, 2024

(54) PROJECTION ASSEMBLY FOR A MOTOR VEHICLE AND METHOD FOR ADJUSTING SAID PROJECTION ASSEMBLY

(71) Applicant: VALEO VISION, Bobigny (FR)

(72) Inventors: Ibrahima Ndiaye, Bobigny (FR); Pascal Garin, Bobigny (FR); Julien Aubert, Bobigny (FR); Clement Olchewsky, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/623,773

(22) PCT Filed: Jun. 26, 2020

(86) PCT No.: PCT/EP2020/068164
§ 371 (c)(1),
(2) Date: Dec. 29, 2021

(87) PCT Pub. No.: WO2021/001283
PCT Pub. Date: Jan. 7, 2021

(65) Prior Publication Data

US 2022/0243891 A1 Aug. 4, 2022

(30) Foreign Application Priority Data

Jul. 1, 2019 (FR) ..................................... 19 07261

(51) Int. Cl.
*F21S 41/63* (2018.01)
*F21S 41/25* (2018.01)
*F21S 41/29* (2018.01)

(52) U.S. Cl.
CPC ............. *F21S 41/635* (2018.01); *F21S 41/25* (2018.01); *F21S 41/295* (2018.01)

(58) Field of Classification Search
CPC ......... F21S 41/635; F21S 41/25; F21S 41/295
See application file for complete search history.

(56) References Cited

U.S. PATENT DOCUMENTS 6,092,914 A 7/2000 Esakoff et al.
2014/0092592 A1 4/2014 Melzner et al.
(Continued)

FOREIGN PATENT DOCUMENTS

CN 108980775 A 12/2018
EP 0 780 625 A1 6/1997
(Continued)

OTHER PUBLICATIONS

International Search Report dated Aug. 12, 2020 in PCT/EP2020/068164 filed on Jun. 26, 2020, (2 pages).
(Continued)

*Primary Examiner* — Elmito Breval
(74) *Attorney, Agent, or Firm* — Oblon, McClelland, Maier & Neustadt, L.L.P.

(57) ABSTRACT

An assembly for projecting a light beam includes a first sub-assembly for generating light rays, and a second sub-assembly comprising a converging lens. The first sub-assembly is arranged upstream of the second sub-assembly such that the light rays coming from the first sub-assembly are sent to the converging lens and such that the light rays emerging from the converging lens form the light beam. According to the invention, the projection assembly includes at least one connection system connecting the first sub-assembly to the second sub-assembly and allowing at least one translational movement of the first sub-assembly and the second sub-assembly relative to each other in a first longitudinal direction (X). Moreover, the connection system comprises a locking member that is movable between a first position in which the first sub-assembly and the second sub-assembly are motionless with respect to each other and a second position enabling the translational movement.

21 Claims, 13 Drawing Sheets

(56) References Cited

U.S. PATENT DOCUMENTS

| | | | |
|---|---|---|---|
| 2018/0118093 | A1 | 5/2018 | Yamazumi et al. |
| 2020/0217473 | A1 | 7/2020 | Mitterlehner et al. |

FOREIGN PATENT DOCUMENTS

| | | | |
|---|---|---|---|
| JP | 56-2526 | A | 1/1981 |
| JP | 2019-185971 | A | 10/2019 |
| WO | WO 99/67569 | A1 | 12/1999 |
| WO | WO 2018/227221 | A1 | 12/2018 |

OTHER PUBLICATIONS

Chinese Office Action dated Nov. 30, 2023 issued in Chinese Patent Application No. 202080047693.3 filed on Jun. 26, 2020, total 12 pages.

PROJECTION ASSEMBLY FOR A MOTOR VEHICLE AND METHOD FOR ADJUSTING SAID PROJECTION ASSEMBLY

The present invention relates to the field of motor vehicle lighting. In particular, the invention relates to a projection assembly projecting a beam of light performing a lighting function, for example a headlamp low-beam function. The invention also relates to a method for adjusting said projection assembly in order to improve the visual appearance of the beam of light emitted by said assembly. The invention finally relates to an adjusting device implementing said method.

In the field of automotive lighting, assemblies for projecting a beam of light, also known as optical projection modules, designed notably to emit a headlamp low beam, or passing beam, or else a headlamp high beam, are known.

The projection assembly may comprise diverse and varying optical elements according to the desired purpose of the beam of light.

By way of example, in order to obtain a beam of light performing a low-beam "passing" function, the projection assembly may comprise one or more light sources, one or more reflectors and one or more shields to form a cut-off in the beam of light.

Another known example are dual-function projection assemblies able to produce a low beam and a high beam. For example, the projection assembly may comprise a removable shield able to pass from a first position in which the shield does not occult the beam produced by the light source of the assembly, to a second position in which it occults part of the emitted beam produced by the source.

In both the aforementioned examples, the shape of the beam cut-off for the low beam corresponds to the shape of the shield that intercepts part of the beam produced by the light source. The cut-off line perceived on the low beam is the image of one edge of the shield, also known as the cut-off edge.

The low beam is projected onto the road by a convergent lens that forms part of the projection assembly.

The problem of chromatic aberrations along the cut-off line of the low beam in projection assemblies is known. The chromatic aberration is generally due to the variation in the refractive index of the lens as a function of wavelength, which has the corollary effect that the focal point for the "blue" wavelengths, known as the "blue" focal point, is offset from the focal point for the "red" wavelengths, known as the "red focal point", along the optical axis.

As a result, if, upstream of the convergent lens, the cut-off edge is situated close to the "blue" focal point, the low beam cut-off line may exhibit a color close to blue. Likewise, if the cut-off edge is situated close to the "red" focal point, the cut-off line will have a color close to red.

Such a chromatic-aberration problem lowers the visual quality of the beam of light. In addition, there is a risk that this beam will not be compliant with the regulations to which the projection assembly must conform. Specifically, the color red is often the color not accepted by most regulations. In particular, red is theoretically reserved for the signaling lights at the rear of the vehicle. Therefore, if the cut-off edge is situated too close to the red focal point, there is a risk that the low beam will be rejected during the homologation of the projection assembly.

The color blue is accepted by the regulations provided that the intensity of the blue color remains below an upper limit. As a result, if the intensity of the blue color exceeds this upper limit, the beam of light will therefore not comply with the regulations. In addition, the color blue impairs the visual comfort of the beam of light and is therefore disliked by drivers.

Thus, one objective of the invention is to propose a projection assembly able to correct for the problem of chromatic aberration or fringing.

To this end, a first subject matter of the invention is a projection assembly projecting a beam of light along an optical axis, the projection assembly comprising:

a subassembly for generating rays of light, referred to as first subassembly; and a subassembly comprising a convergent lens, referred to as second subassembly;

the first and second subassemblies being arranged relative to one another in such a way that the rays of light emanating from the first subassembly are sent toward the convergent lens and that the rays of light leaving said convergent lens form the beam of light.

According to the invention, the projection assembly comprises at least one connecting system connecting the first subassembly to the second subassembly and allowing at least a translational movement of the first subassembly and of the second subassembly one relative to the other in a first direction parallel to the optical axis, and the connecting system comprising a locking member able to move between a first position in which the first subassembly and second subassembly are immobile relative to one another, and a second position allowing said translational movement.

Thus, by virtue of the connecting system, the distance, measured in the first direction, between the two subassemblies can be adjusted until what is obtained is a beam of light exhibiting very little, if indeed any, chromatic aberration, thereby improving the visual appearance of said beam. Furthermore, the connecting system is able to limit the degrees of freedom in the movement and facilitate this adjustment.

In the example of a projection assembly generating a beam with a cut-off, the distance between the two subassemblies is altered until the cut-off edge of the shield is close to the focal point for the color accepted by the regulations. The beam of light thus formed therefore comprises a cut-off line with very little fringing and of the tolerated color. The beam of light therefore meets the regulatory colorimetry criteria.

Furthermore, the solution proposed according to the invention is suitable for any type of shield, including shields with a simple cut-off edge. The proposed solution makes it possible to dispense with the need for shields which, although high-performance, are sophisticated and expensive.

The projection assembly according to the invention may optionally comprise one or more of the following features:

- the connecting system comprises a bore made in one of either the first subassembly or the second subassembly, and an orifice that is elongate in the first direction and made in the other of either the first subassembly or the second subassembly, the bore and the orifice being positioned facing one another; furthermore, the locking member comprises a screw inserted into the bore and into the orifice and able to move between the first position in which the screw clamps the first subassembly and the second subassembly against one another so as to immobilize them one relative to the other, and the second position in which the screw is loosened so as to allow relative movement of the first subassembly and the second subassembly one relative to the other; thus, irrespective of the position of the screw, the first subassembly and the second subassembly remain connected to one another; in other words, complete detachment of these two subassemblies during adjustment of the distance between them is avoided; this makes it possible to save time in quickly immobilizing the two subassemblies after said adjustment;

the projection assembly comprises an end stop limiting the amplitude of the translational movement in the first direction of the first subassembly and of the second subassembly one relative to the other, and thus the end stop is a safety measure ensuring that the translational movement of the two subassemblies in the first direction does not exceed the limit beyond which there is a risk of the connection between said subassemblies being severed;

by way of example, the end stop is arranged in such a way that when the relative translational movement of the first subassembly and of the second subassembly in the first direction reaches the maximum amplitude, the bore remains in the circumscription of the orifice, and thus for any distance between the two subassemblies, the screw always remains inserted both in the bore and in the orifice;

the projection assembly comprises two connecting systems which are identical and arranged one on each side of the optical axis, notably symmetrically about the optical axis; the two connecting systems thus reinforce the connection between the two subassemblies;

the projection assembly comprises at least one translational-guidance system arranged in such a way as to block the translational movement of the first subassembly and of the second subassembly one relative to the other in a second direction transverse, notably substantially perpendicular, to the first direction; thus, the translational-guidance system blocks transverse relative movement of the two subassemblies because, in certain examples, said transverse movement is not necessary for correcting the problem of chromatic aberration of the beam of light;

according to the preceding paragraph, the translational-guidance system comprises a stud produced on one of either the first subassembly and the second subassembly, and a slot made in the other of either the first subassembly or the second subassembly, said slot extending in the first direction and being arranged in such a way that the width of the slot, measured in the second direction, is substantially equal to the transverse dimension of the stud, likewise measured in the second direction and that the slot is arranged in such a way as to allow the stud to slide in the slot in the first direction; this then is a simple, yet effective and inexpensive, embodiment of the translational-guidance system;

the projection assembly comprises at least one anti-rotation guidance system arranged in such a way as to block rotation of the first subassembly with respect to the second subassembly about an axis transverse, notably substantially orthogonal, to the first direction; in certain examples, rotation between light sources borne by the first subassembly and the lens borne by the second subassembly leads to a change in the path of the rays of light leaving the projection assembly and therefore there is a risk that the beam of light will lose its shape and/or its brightness; it is therefore necessary to block said rotation;

according to the preceding paragraph, the anti-rotation guidance system comprises a finger borne by one of either the first subassembly or the second subassembly, and a bearing surface arranged on the other of either the first subassembly or the second subassembly, the bearing surface extending in the first direction and the finger bearing against the bearing surface in such a way that the bearing surface blocks the movement of the finger in one sense of a third direction perpendicular to the first direction and orthogonal to the transverse axis; this is one exemplary embodiment of the anti-rotation guidance system that is simple, but effective;

according to the preceding paragraph, the anti-rotation guidance system comprises two said bearing surfaces arranged one on either side of the finger in the third direction; the anti-rotation guidance system produced in this way prevents not only rotation of the two subassemblies about the transverse axis, but also movement of said subassemblies in a third direction, notably along the vertical; this guidance system therefore performs two different blocking functions;

according to the preceding paragraph, the anti-rotation guidance system comprises a groove comprising a bottom extending in a first plane parallel to the first direction and to the third direction, and two sides extending from the bottom and in a second plane perpendicular to the first plane, and in that the bearing surfaces are arranged respectively on said sides; this then is a simple, but effective, embodiment of the anti-rotation guidance system.

Another subject matter of the invention relates to a vehicle headlamp comprising a projection assembly according to the invention. Thus, the headlamp according to the invention produces a beam of light of good visual quality free of problems of chromatic aberration.

Another subject matter of the invention relates to a method for adjusting a projection assembly according to the invention. Said method comprises the following steps:

projecting a beam of light emitted by said projection assembly onto a surface at a distance from said projection assembly, the first subassembly being blocked in terms of movement with respect to the second subassembly;

evaluating the visual appearance of the projection of the beam of light;

if the beam of light is non-compliant, unblocking the first subassembly with respect to the second subassembly;

moving the first subassembly with respect to the second subassembly and/or moving the second subassembly with respect to the first subassembly, translationally in the first direction;

evaluating once again the visual appearance of the beam of light projected onto the screen;

if the beam of light is non-compliant, repeating the step of moving the first subassembly with respect to the second subassembly and/or moving the second subassembly with respect to the first subassembly, translationally in the first direction; and if the beam of light is compliant, blocking the first subassembly with respect to the second subassembly.

Thus, at the end of the adjusting method, the beam of light is sure not to exhibit defects caused by chromatic aberration. The adjusting method may continue for as long as the visual appearance of the beam of light is unsatisfactory, notably for as long as the cut-off line still remains fringed or is still of the forbidden color.

The adjusting method according to the invention may optionally comprise one or more of the following features:

said step of unblocking the first subassembly with respect to the second subassembly comprises adjusting the locking member into the second position; furthermore, said step of blocking the first subassembly with respect to the second subassembly comprises adjusting the locking member into the first position; by way of example, when the adjusting member comprises a screw, the adjusting of said member comprises the tightening or the loosening of the screw;

during said translational-movement step, the translational movement of the first subassembly and of the second subassembly one relative to the other is blocked at least in one of the directions that are a second direction and a third direction, said second direction being transverse, notably substantially perpendicular, to the first direction, and the third direction being transverse, notably substantially perpendicular, to the first direction and to the second direction; in other words, during the step of moving the two subassemblies along the optical axis, movement in the other two directions transverse to said optical axis, and referred to as transverse movement, is prevented; this makes it possible to avoid errors in the formation of the beam of light and caused by transverse movement of the first subassembly and the second subassembly one relative to the other; the blocking of the transverse movement may be performed by the projection assembly itself or by an external means;

during said translational-movement step, rotation of the first subassembly with respect to the second subassembly about an axis transverse, notably substantially orthogonal, to the first direction is blocked.

Another subject matter of the invention relates to an adjusting device for implementing the adjusting method, according to the invention, for adjusting a projection assembly according to the invention. This adjusting device comprises a first support intended to accept the first subassembly of the projection assembly and a second support intended to accept the second subassembly of the projection assembly, the first support and the second support being arranged in such a way as to be able to move translationally one relative to the other in the first direction and maintain the connection between said first subassembly and said second subassembly.

Thus, once the projection assembly has been placed in the adjusting device, the adjusting of the distance between the first subassembly and the second subassembly of said projection assembly is performed by a relative movement of the first support and the second support of said adjusting device. During adjustment, the first subassembly remains connected to the second subassembly.

The adjusting device according to the invention may optionally comprise one or more of the following features:

the adjusting device comprises an end stop limiting the amplitude of the translational movement of the first subassembly and of the second subassembly one relative to the other in the first direction; thus the adjusting device imposes a limit on the translational movement of the subassemblies of the projection assembly so as to avoid severing the connection between these subassemblies;

the adjusting device comprises a translational blocking member arranged in such a way that, when the projection assembly is placed in said device, the translational movement of the first subassembly and of the second subassembly one relative to the other is blocked at least in one of the directions that are a second direction and a third direction, said second direction being transverse to the first direction, and the third direction being transverse to the first direction and to the second direction; in other words, once the projection assembly is mounted in the adjusting device, only relative translational movement of the two subassemblies along the optical axis is permitted; because other movements are blocked, adjustment of the beam of light is simplified; in addition, since the translational-blocking member is arranged on the adjusting device, there is therefore no need to equip the projection assembly with another means of blocking transverse movement, thereby simplifying the structure of said projection assembly;

the adjusting device comprises a rotation-blocking member arranged in such a way that when the projection assembly is placed in said device, the rotation of the first subassembly with respect to the second subassembly about an axis transverse, notably substantially orthogonal, to the first direction is blocked; thus, the adjusting device blocks rotation between the subassemblies in order to prevent irregularities from appearing in the beam of light;

the adjusting device comprises an adjusting member intended to adjust the locking member into the first position or into the second position; by way of example, the adjusting member comprises a screwdriver head able to collaborate with the locking member which is a screw;

the adjusting device comprises a visual-check system for visually checking the beam of light emitted by the projection assembly, and a central control unit connected to the first support, to the second support and to said visual-check system, and said central control unit commands the relative movement of the first support and of the second support according to the signal from the visual-check system; thus, the adjusting device makes the adjusting method more automated and faster.

Unless otherwise stated, the terms "front", "rear", "lower", "upper", "top", "bottom", "transverse", "longitudinal", "horizontal", as well as their gender or number declensions, refer to the direction of the emission of light out of the lighting module. Unless otherwise stated, the terms "upstream" and "downstream" refer to the direction of propagation of the light inside the projection assembly.

Further features and advantages of the invention will become apparent upon reading the detailed description of the following non-limiting examples, which description will be better understood with reference to the appended drawings, in which.

In the example illustrated, the projection assembly 1 has an optical axis I extending in an upstream-to-downstream direction of said assembly. As illustrated in the figures, the optical axis I is parallel to a first direction X also known as the longitudinal direction X.

Other directions are also depicted in the figures. One of these directions is a second direction Y that is transverse, notably substantially perpendicular, to the longitudinal direction X. A third direction Z is transverse, notably substantially perpendicular, to the longitudinal direction X and to the transverse direction Y. The third direction Z here extends from the bottom of the figures toward the top.

In the example illustrated, the projection assembly 1 is arranged in such a way that the longitudinal direction X is substantially parallel to the longitudinal axis of a vehicle (not shown) equipped with said assembly. In addition, with this arrangement of the projection assembly 1, the longitudinal direction X and the transverse direction axis Y belong to a horizontal plane. The third direction Z, which is perpendicular to the other two, represents the vertical.

Here, the terms "horizontal" and "vertical" are defined under the conditions of operation of the projection assembly in a motor vehicle. The term "horizontal" refers to an orientation parallel to the plane of the horizon, while the term "vertical" refers to an orientation perpendicular to the plane of the horizon.

Figure 1:
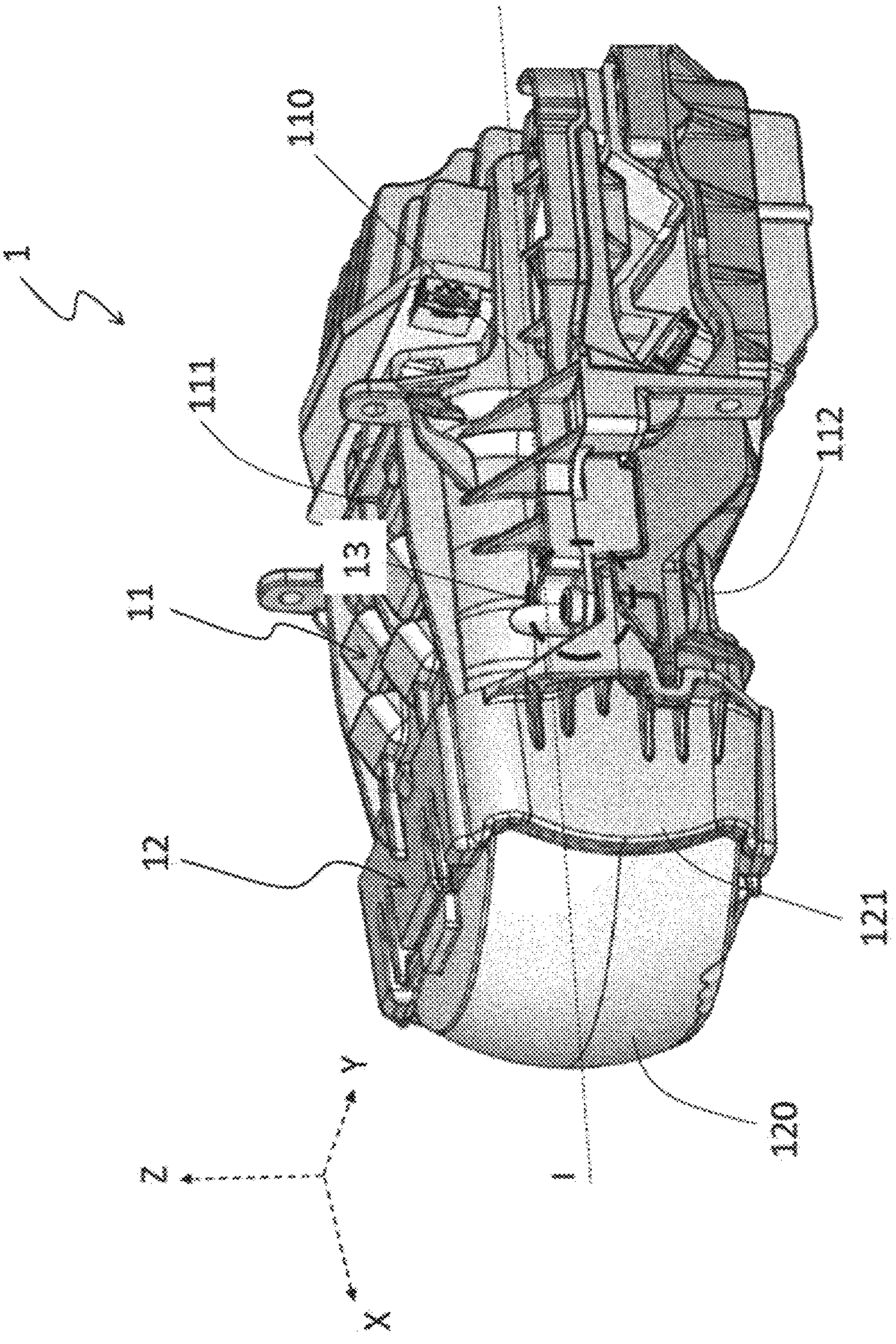
FIG. 1 is a perspective view of one exemplary embodiment of a projection assembly according to the invention.

As illustrated in FIG. 1, the projection assembly 1 comprises a first subassembly 11 generating rays of light, and a second subassembly 12 arranged downstream of said first subassembly 11.

The second subassembly 12 comprises a convergent lens 120 which projects forward the rays of light coming from the first subassembly 11 so as to form a beam of light performing an optical function. A lens holder 121 acts as a support for the lens 120.

The first subassembly 11, for its part, comprises optical elements such as light sources, light guides, collimators, arranged in such a way as to send the rays of light toward the convergent lens 120. Here, the optical elements are protected by a chassis 110, made up of two components: a lower chassis 112 and an upper chassis 111. The detailed composition of the first subassembly 11 will be described later on in the description.

In the example illustrated, the first subassembly 11 and the second subassembly 12 are connected to one another by two identical connecting systems 13 arranged one on each side of the optical axis I. Here, the two connecting systems 13 are symmetrical about the optical axis I.

Here, given the mutual resemblance of these connecting systems, just one system is visible and illustrated in full in the figures. The description hereinafter applies in the same way to the other connecting system that is not fully visible in the figures.

The connecting system 13 here comprises a bore 131 made in the first subassembly 11. Specifically, the bore 131 comprises a first bore 131*a* made in the upper chassis 111 and a second bore 131*b* made in the lower chassis 112. The first bore 131*a* and the second bore 131*b* are also referred to respectively as the upper bore 131*a* and the lower bore 131*b*. These two bores are tapped and have the same diameter.

Here, the first bore 131*a* is made in a lug 134 situated on one lateral side of the upper chassis 111. The second bore 131*b* is made in a post 135 of the lower chassis 112. This post 135 is visible for example in FIG. 13.

Figure 2:
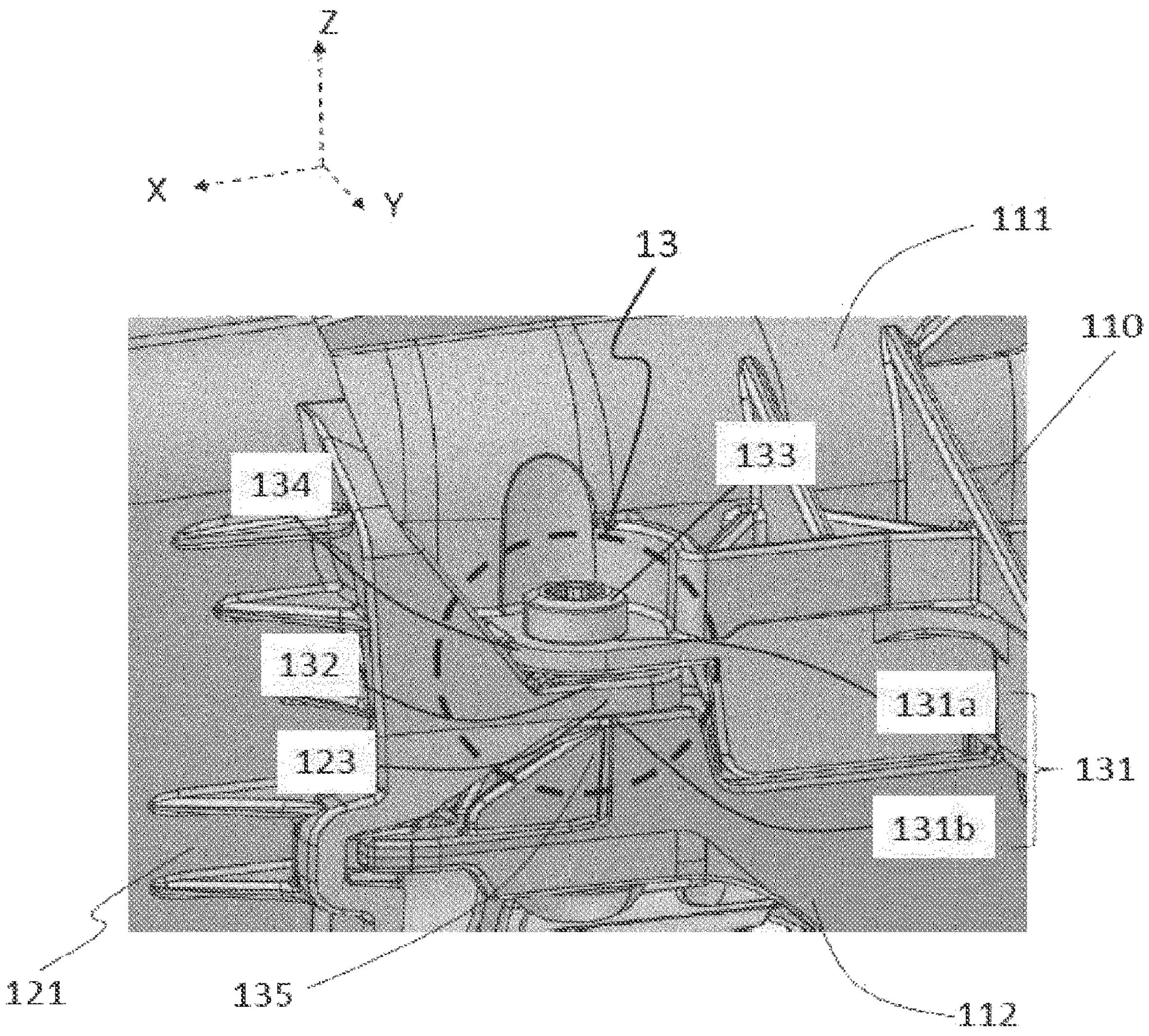
FIG. 2 is a detailed view of FIG. 1, showing a connecting system of the projection assembly.
Figure 3:
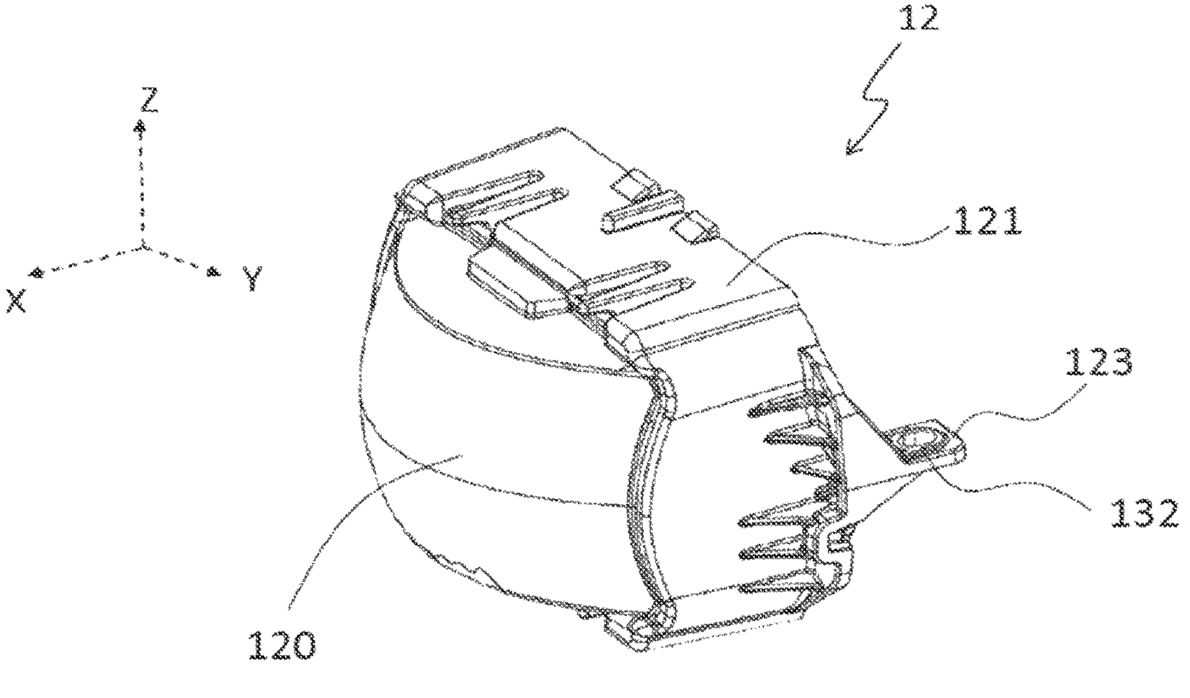
FIG. 3 is a perspective view of a second subassembly of the projection assembly of FIG. 1, said second subassembly comprising a convergent lens.
Figure 4:
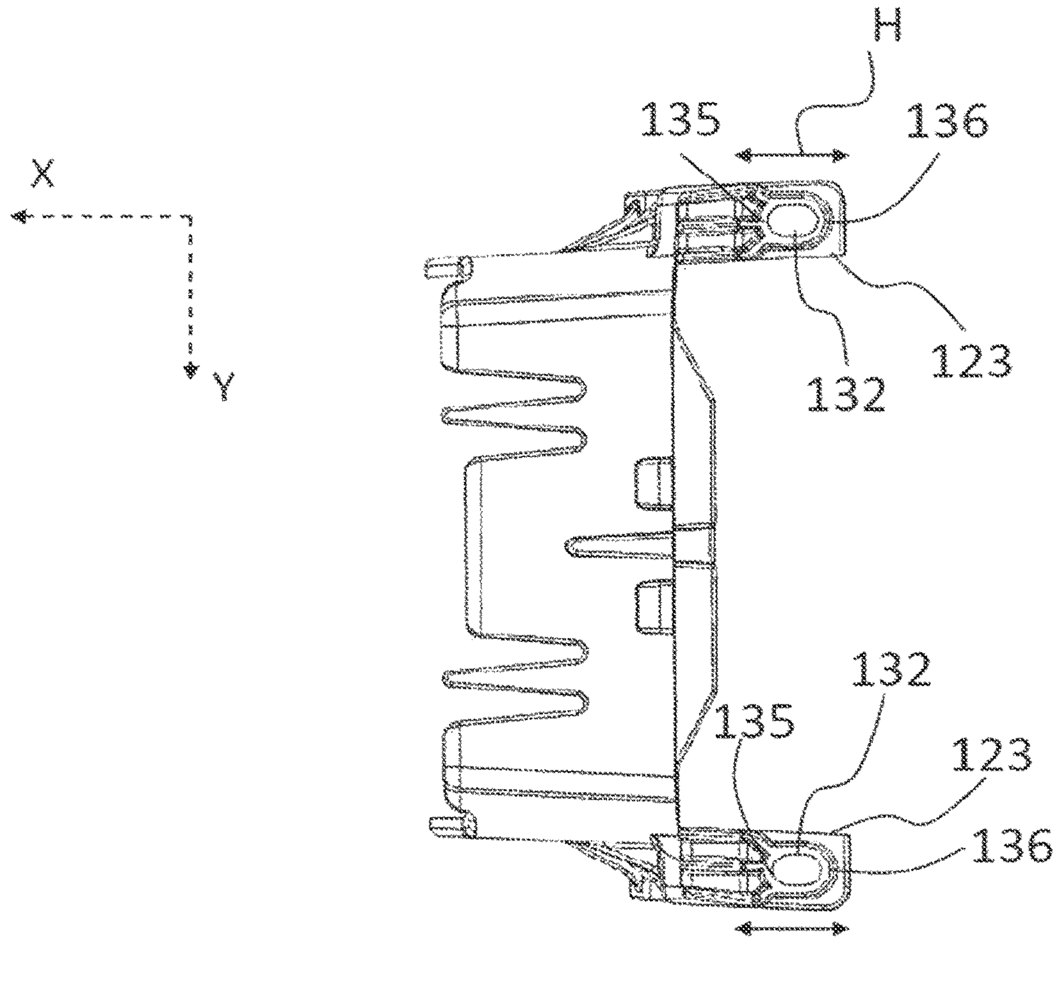
FIG. 4 is a view from above of a lens holder of the first subassembly of FIG. 3.

With reference to FIG. 2, the connecting system 13 further comprises an orifice 132 made in the second subassembly 12, specifically in the lens holder 121. As can be seen in FIGS. 3 and 4, the orifice 132 is elongate in the longitudinal direction X. In other words, the orifice 132 has an oblong shape longer than it is wide. Within the connecting system 13, the orifice 132 is interposed between the upper bore 131*a* and the lower bore 131*b*.

Here, the orifice 132 is made in a tab 123 extending rearward on one lateral side of the lens holder 121.

In addition, the connecting system 13 comprises a locking member 133 which in this instance is a screw 133. In order to connect the first subassembly 11 to the second subassembly 12, the screw 133 is inserted into the upper bore 131*a*, into the orifice 132 and then into the lower bore 131*b*.

In the example illustrated, the screw 133 is able to move translationally in the vertical direction Z by turning on itself. To do this, the screw 133 has a screw thread whereas the upper and lower bores 131*a*, 131*b* are tapped.

Thus, the screw 133 can be lowered and raised between a first position in which the first subassembly 11 and the second subassembly 12 are clamped against one another, and a second position in which these two subassemblies are loose.

Specifically, when the screw 133 is in the first position, the screw 133 presses the lug 134 bearing the first bore 131*a* against the tab 123 bearing the orifice 132, which is bearing against the post 135 bearing the second bore 131*b*. Described differently, the tab 123 is sandwiched between the lug 134 and the post 135. This pressing-together allows the first subassembly 11 and the second subassembly 12 to be clamped against one another, thus immobilizing these two subassemblies with respect to one another.

When the screw 133 is in the second position, the lug 134 is no longer pressed against the tab 123. The latter is thus free of the clamping between the lug 134 above and the post 135 below. Therefore, thanks to the oblong shape of the orifice 132, the lens holder 121 bearing the tab 123 is free to move forward or backward as indicated by the double-headed arrow H in FIG. 4, relative to the chassis 110 bearing the lug 134 and the post 135. Conversely, and still thanks to the oblong shape of the orifice 132, the chassis 110 is able to move forward or backward according to the double-headed arrow H with respect to the lens holder 121.

When the chassis 110 and the lens holder 121 move one relative to the other in the direction of the double-headed arrow H, the screw 133 slides in the longitudinal direction X in the orifice 132. The latter therefore acts as a guide for the relative movement between the first subassembly 11 and the second subassembly 12. However, this movement is limited because of contact between the screw 133 and a front edge 135 or a rear edge 136 of the orifice 132. Thus, the orifice 132 also acts as an end stop delimiting the amplitude of the translational movement of the subassemblies 11 and 12 in the longitudinal direction X.

In the example illustrated, in order to pass from the first position to the second position, the screw 133 moves upward, rotating on itself. As a result, the first position may also be referred to as the screw-down locked position, while the second position may also be referred to as the screw-up unlocked position.

In order to assist with the relative movement of the first subassembly 11 and the second subassembly 12 in the longitudinal direction X, the projection assembly comprises a translational-guidance system 14.

Figure 5:
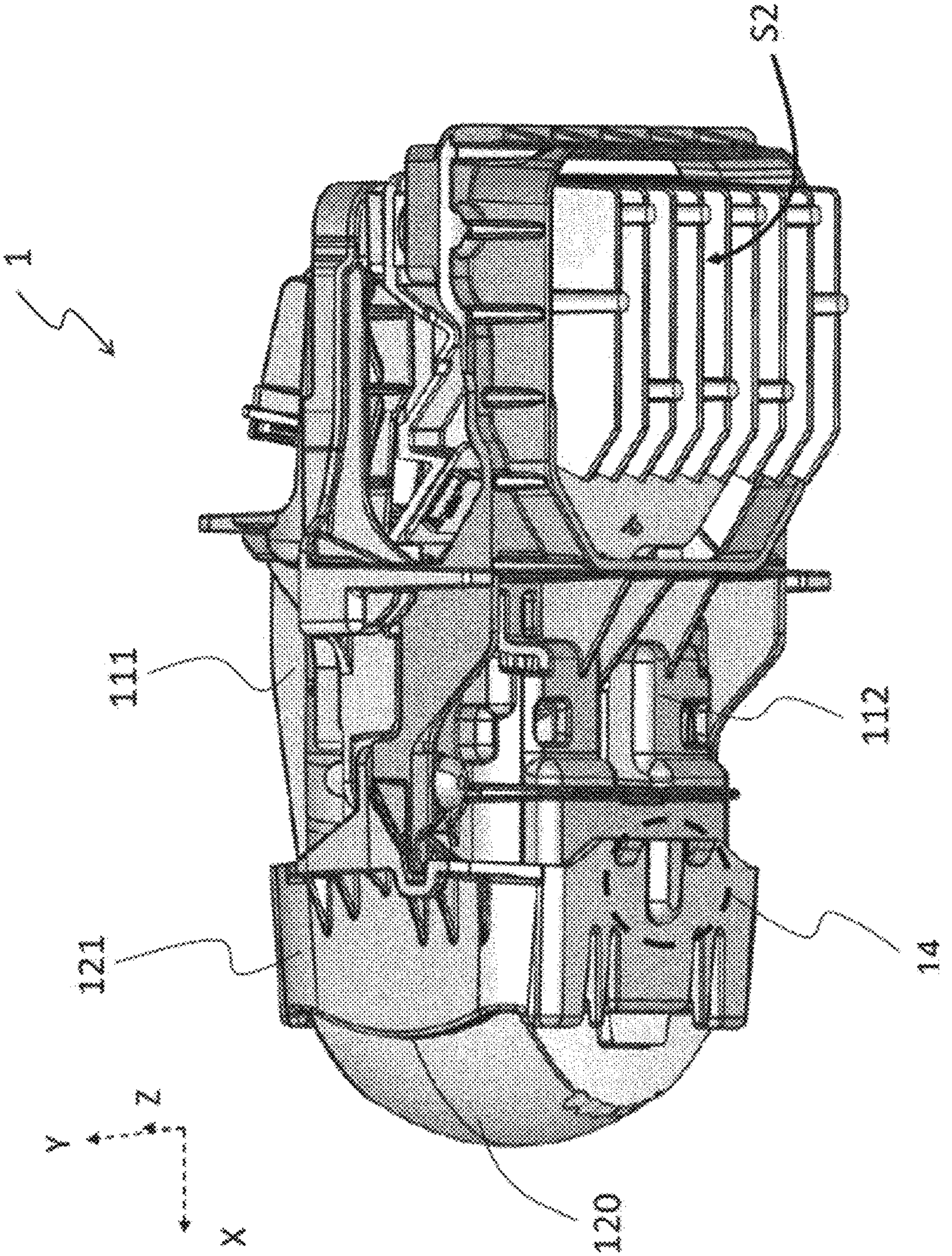
FIG. 5 is a view from beneath of the projection assembly of FIG. 1, showing a translational-guidance system for guiding the relative translational movement of the first subassembly and the second subassembly.

As illustrated in FIG. 5, said guidance system 14 is situated on a lower face S2 of the projection assembly.

Figure 6:
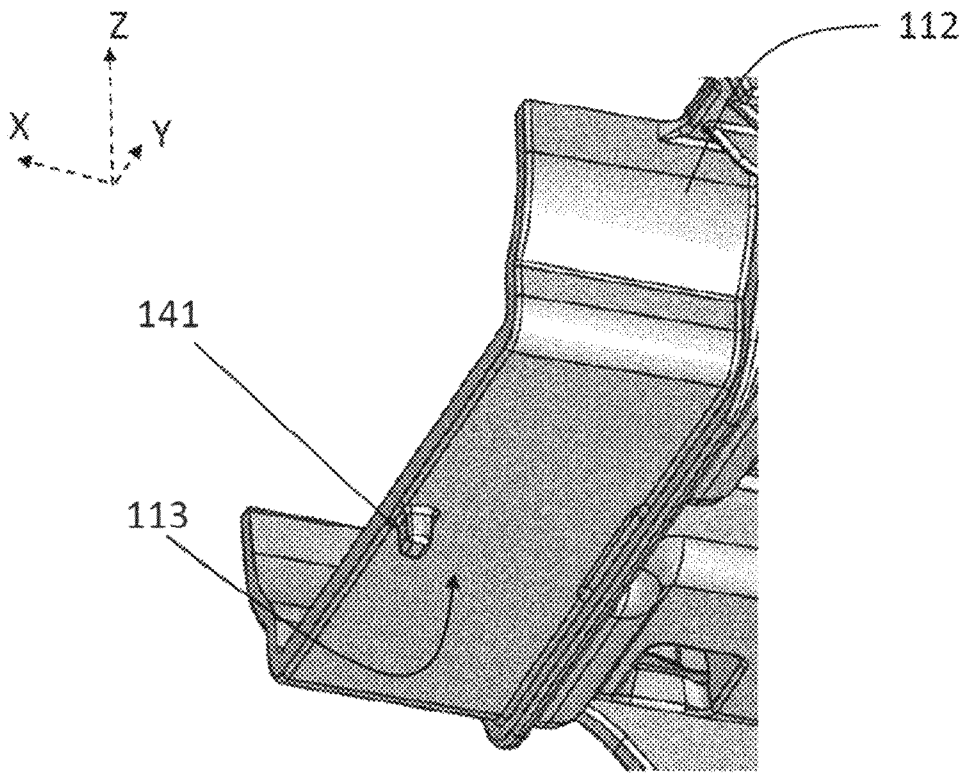
FIG. 6 is a view from beneath of the lower chassis of the first subassembly, showing a stud that forms part of the translational-guidance system.
Figure 7:
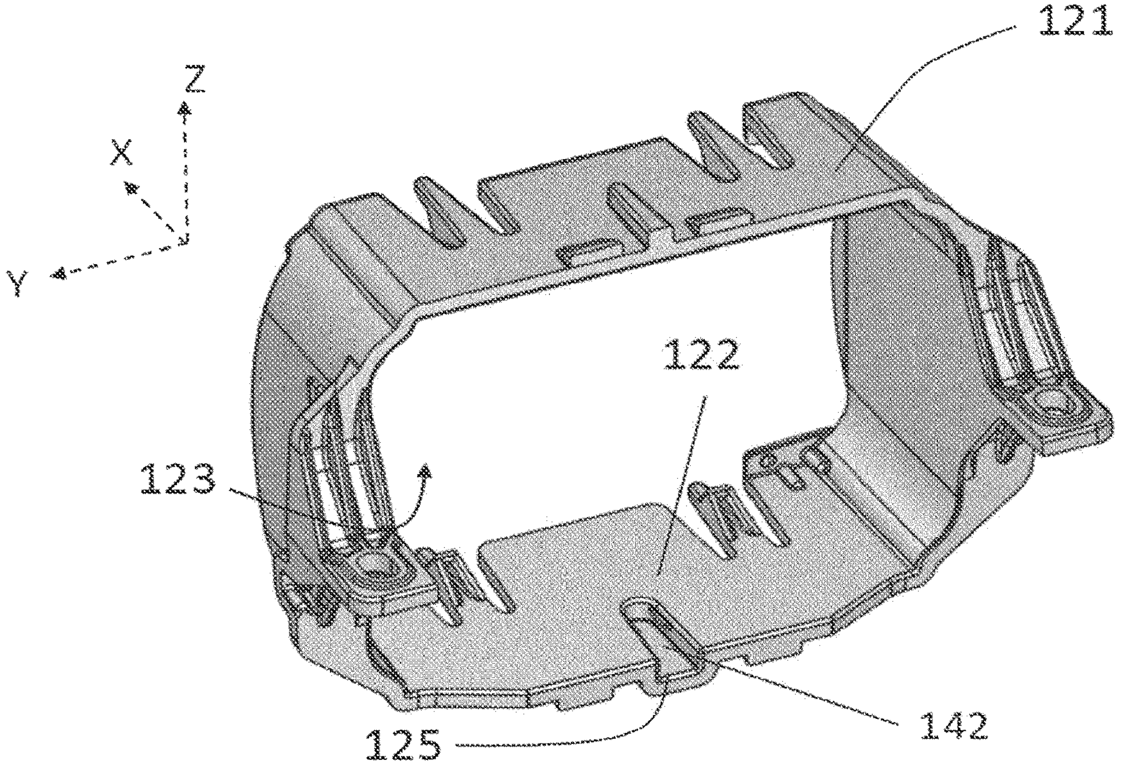
FIG. 7 is a rear view of the lens holder of the second subassembly, showing a slot that forms part of the translational-guidance system.

In FIG. 6 and in FIG. 7, the guidance system 14 comprises a stud 141 and a slot 142 in which said stud 141 is engaged.

In the example illustrated, the stud 141 is made on the lower chassis 112 of the first subassembly 11. In this instance, the stud 141 projects from a lower face 113 of the lower chassis 112 and extends downward. The stud 141 in this instance has a substantially rectangular section.

The slot 142 is made in a lower wall 122 of the lens holder 121. The slot 142 opens onto a rear face 123 of the lens holder 121 so as to form a rear opening 125 by means of which the stud 141 enters the slot 142.

Figure 8:
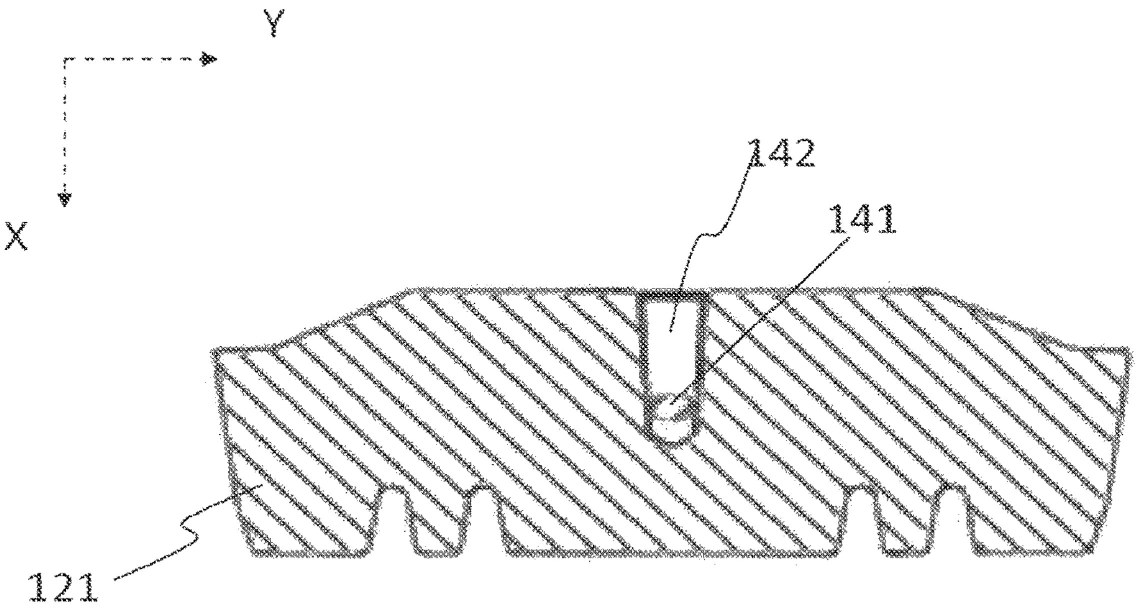
FIG. 8 is a view in section on a horizontal plane passing through the translational-guidance system.
Figure 9:
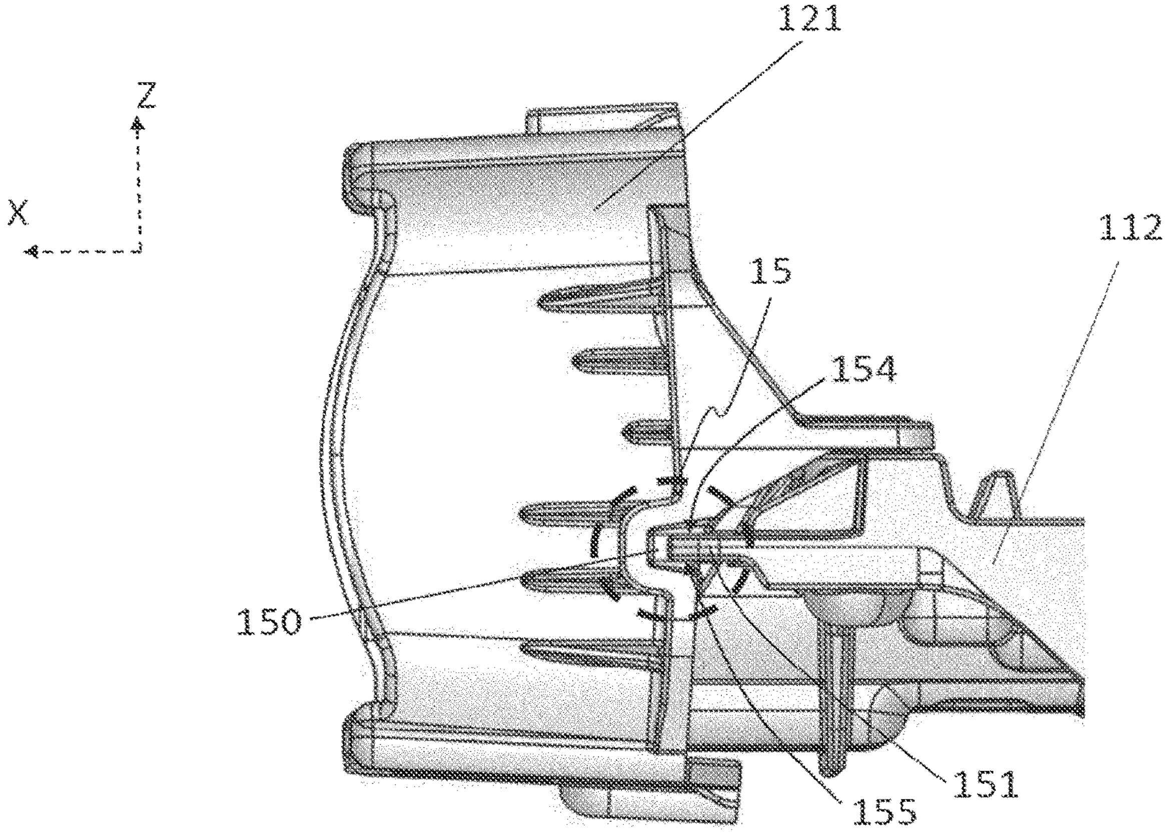
FIG. 9 is a side view of the lens holder and of the lower chassis, said view showing an anti-rotation guidance system preventing relative rotational movement of the first subassembly and the second subassembly.
Figure 10:
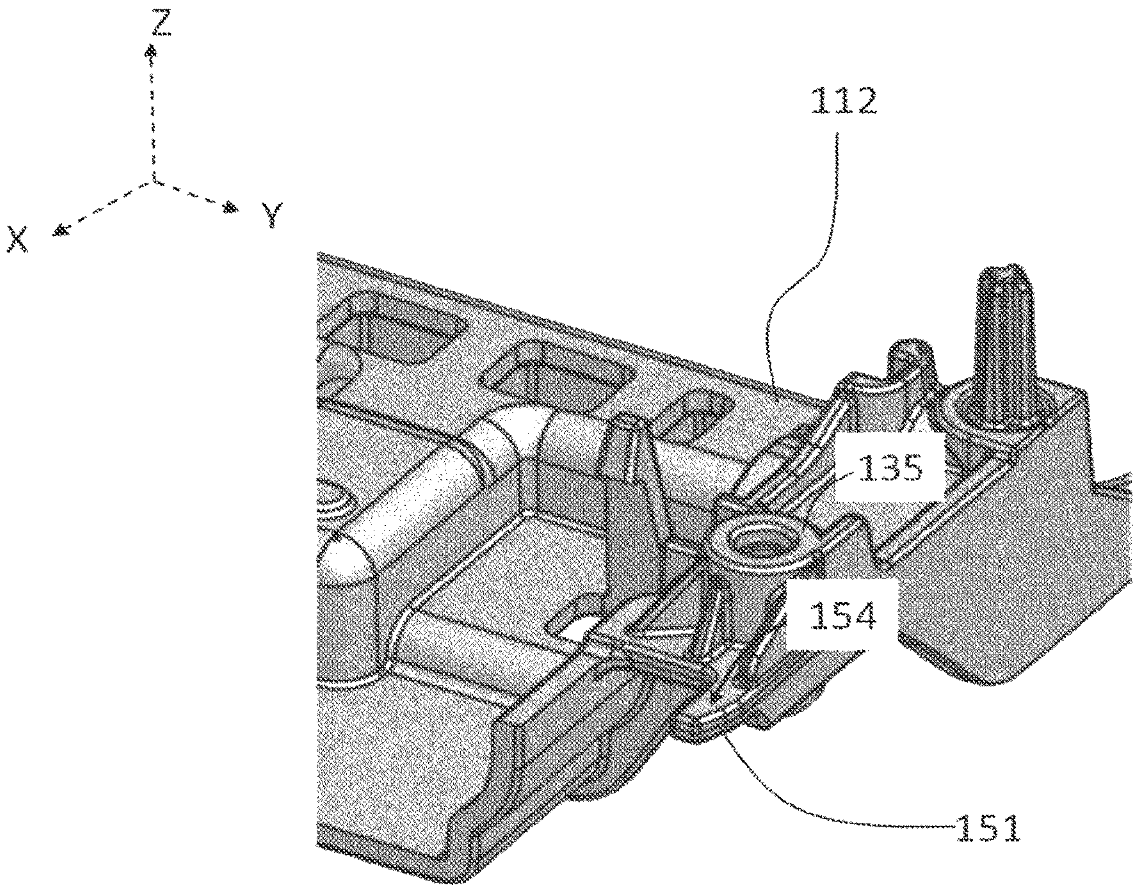
FIG. 10 is a perspective and front view of the lower chassis, said view showing a finger that forms part of the anti-rotation guidance system.

As illustrated in FIG. 8, the width of the slot 142, measured in the transverse direction Y, is substantially equal to the width of the stud 141, likewise measured in the direction Y. Thus, the two sides of the stud 141 are in contact with the two lateral edges of the slot 142 respectively, thereby preventing any relative movement in the transverse direction Y of the lower chassis 112 with respect to the lens holder 121, and therefore of the first subassembly 11 with respect to the second subassembly 12.

Furthermore, the slot 142, which extends mainly in the longitudinal direction X, has a length greater than that of the stud 141. As a result, the stud 141 is able to slide in the slot 142 in the longitudinal direction X.

When the first subassembly 11 is connected to the second subassembly 12, the stud 141 is engaged in the slot 142. The stud 141 slides in the slot 142 at the same time as the first subassembly 11 and the second subassembly 12 move relative to one another in the longitudinal direction X. During this movement, thanks to the engagement of the stud 141 in the slot 142, any relative movement of the two subassemblies 11 and 12 in the transverse direction Y is prevented. In other words, the translational-guidance system 14 ensures that only movement of the two subassemblies 11 and 12 relative to one another along the optical axis I is possible.

In the example illustrated, the projection assembly 1 further comprises two anti-rotation guidance systems 15 that are identical and arranged one on each side of the projection assembly 1. Furthermore, the two anti-rotation guidance systems 15 are arranged, in this instance symmetrically about the optical axis I. Given the similarity between the two systems, only one anti-rotation guidance system 15 will be described hereinafter, and this description applies in the same way to the other one.

With reference to FIGS. 9 to 12, the anti-rotation guidance system 15 comprises a finger 151 and a groove 152. The finger 151 is borne here by the lower chassis 112 of the first subassembly 11, while the groove 150 is made in the lens holder 121.

The finger 151 extends forward from a portion situated in front of the post 135 of the connecting system 13. The finger 151 has an upper face 154 and a lower face 155 that are relatively planar.

The groove 150 has a bottom 153 extending in a vertical plane parallel to the longitudinal direction X and to the vertical direction Z. The groove 150 also comprises two sides 152 extending from the bottom 153 toward the outside in the transverse direction Y. In other words, the sides 152 extend in a horizontal plane perpendicular to the vertical plane.

Here, the two sides 152 are arranged facing each other. The distance d, measured in the vertical direction Z, between said sides 152 is substantially equal to the thickness of the finger 151 so that when the finger 151 is inserted in the groove 150, the upper face 154 and the lower face 155 of the finger 151 each bear against a corresponding side 152.

Figure 11:
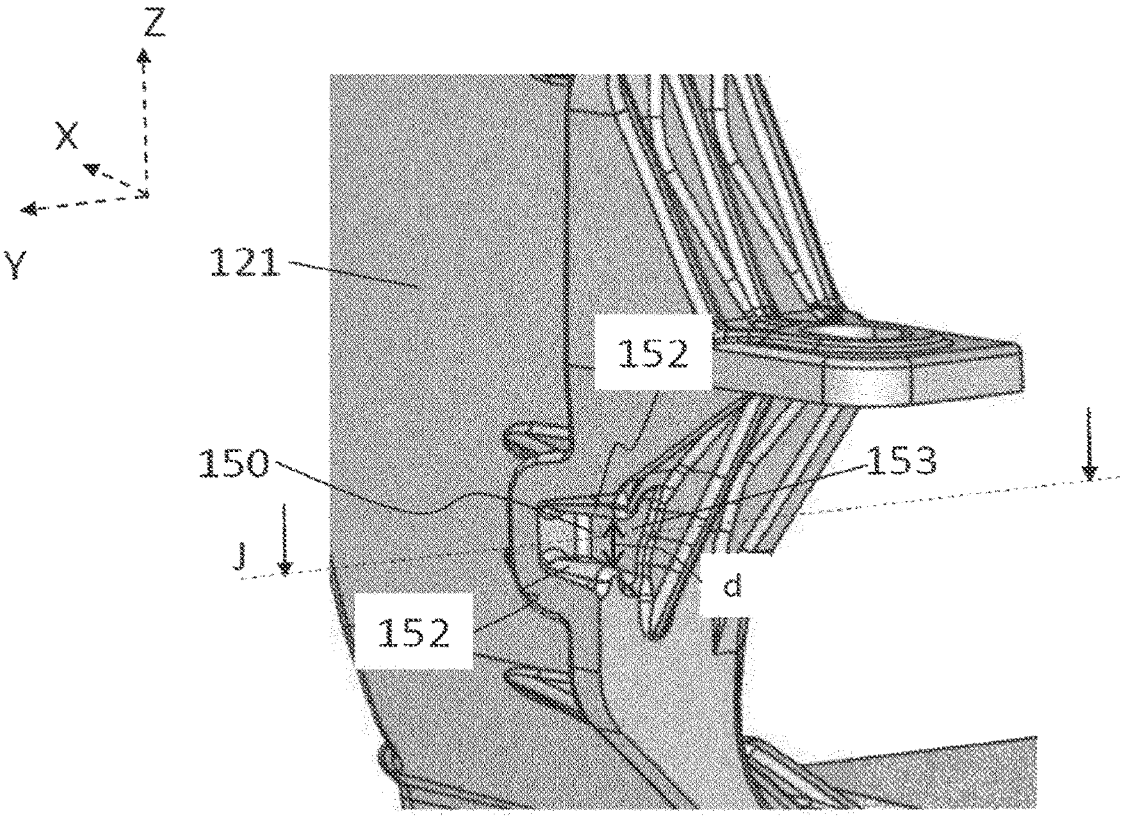
FIG. 11 is a rear view of the lens holder showing a groove that forms part of the anti-rotation guidance system.

Such pressure from the top and bottom of the finger 151 blocks the rotation of the lower chassis 112 with respect to the lens holder 121 about an axis J that is transverse, and in this instance substantially orthogonal, to the longitudinal direction X. In other words, the anti-rotation guidance system 15 with the finger 151 inserted into the groove 150 prevents the first subassembly 11 from rotating with respect to the second subassembly 12 about a transverse axis J. Said transverse axis J, depicted in FIGS. 11 and 12, is parallel to the transverse direction Y.

In addition, the pressure from the top and bottom of the finger 151 blocks movement of the first subassembly 11 and of the second subassembly 12 relative to one another in the vertical direction Z.

Figure 12:
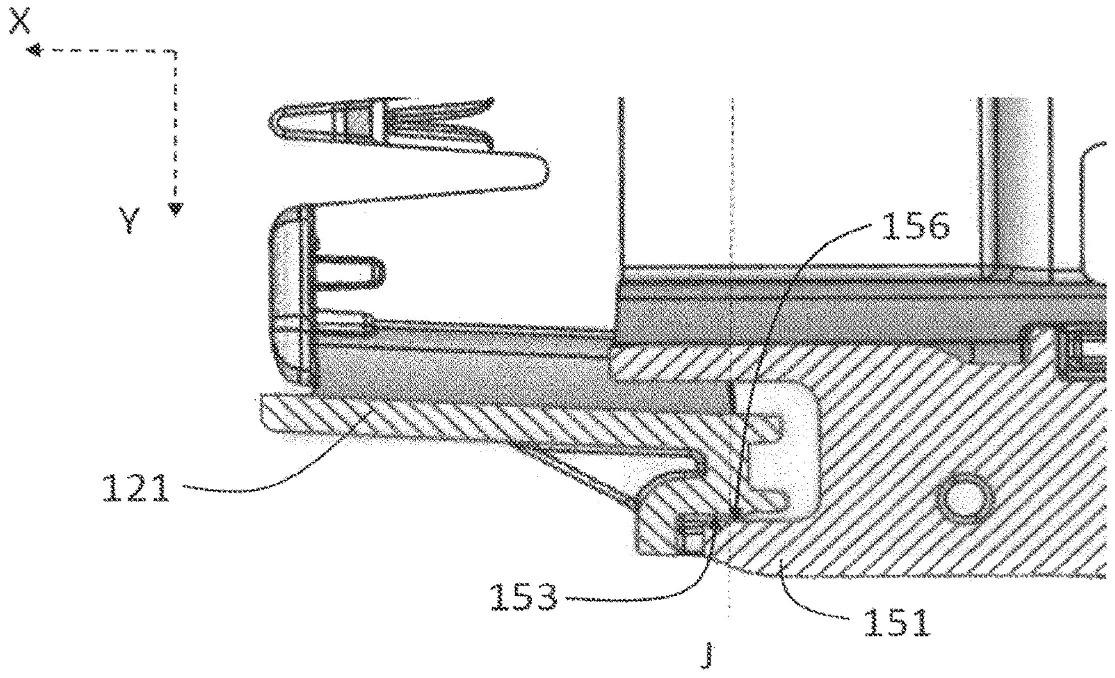
FIG. 12 is a view in section on a horizontal plane passing through the anti-rotation guidance system; this being a view from above as indicated by the arrows in FIG. 12.

As may be seen in FIG. 12, when the finger 151 is inserted into the groove 150, the finger 151 also bears against the bottom 153 of the groove 150. In this example, it is a right-hand lateral face 156 of the finger 151 which bears against the bottom 153. On the other side of the projection assembly 1, and in the other anti-rotation guidance system, the same pressure is applied by the finger bearing against the bottom of the groove. Thus, the pressure of the fingers 151 on the two sides of the lens holder 121 ensures correct retention between the first subassembly 11 and the second subassembly 12. In addition, the presence of the fingers 151 serves to prevent the two subassemblies 11 and 12 from rotating relative to one another about the vertical direction Z.

Moreover, here, the anti-rotation guidance system 15 is arranged in such a way as to allow the finger 151 to slide in the groove 150 in the longitudinal direction X, and therefore allow a slideway movement in the direction X between the first subassembly 11 and the second subassembly 12. It should be noted that the finger 151 remains engaged in the groove 150 whatever the distance between the first subassembly 11 and the second subassembly 12. In other words, the finger 151 remains engaged in the groove 150 during movement of the first subassembly 11 and of the second subassembly 12 in the longitudinal direction X.

In summary, in the projection assembly 1 as illustrated, the first subassembly 11 is connected to the second subassembly 12 by means of the connecting system 13. The two subassemblies 11 and 12 thus connected may move one relative to the other in the longitudinal direction X, which is to say along the optical axis I. This movement may be halted by the locking member 133 which in this instance is a screw 133 belonging to the connecting system 13 when the screw 133 is in the first position.

Furthermore, the projection assembly 1 is equipped with the translational-guidance system 14 and with the anti-rotation guidance system 15. As explained previously, the translational-guidance system 14 blocks the transverse movement of the two subassemblies 11 and 12. At the same time, the anti-rotation guidance system 15 blocks relative rotation between these subassemblies about the axis J and translational movement thereof, one relative to the other, in the vertical direction Z.

Nevertheless, the translational-guidance system 14 and the anti-rotation guidance system 15 are designed in such a way as to allow the two subassemblies 11 and 12 relative translational movement in the longitudinal direction X.

Thus, in the example of projection assembly 1 illustrated, the favored movement is the movement of the first subassembly 11 and of the second subassembly 12 closer toward or farther away from one another along the optical axis I. The purpose of this movement is to adjust the distance between the two subassemblies 11 and 12 and, in particular, between optical elements of the first subassembly 11 and the lens 120 of the second subassembly 12.

In order to better explain the advantage of adjusting the distance between the subassemblies 11 and 12, the components of the first subassembly 11 and how they are arranged with respect to the lens 120 will be described hereinafter.

Figure 13:
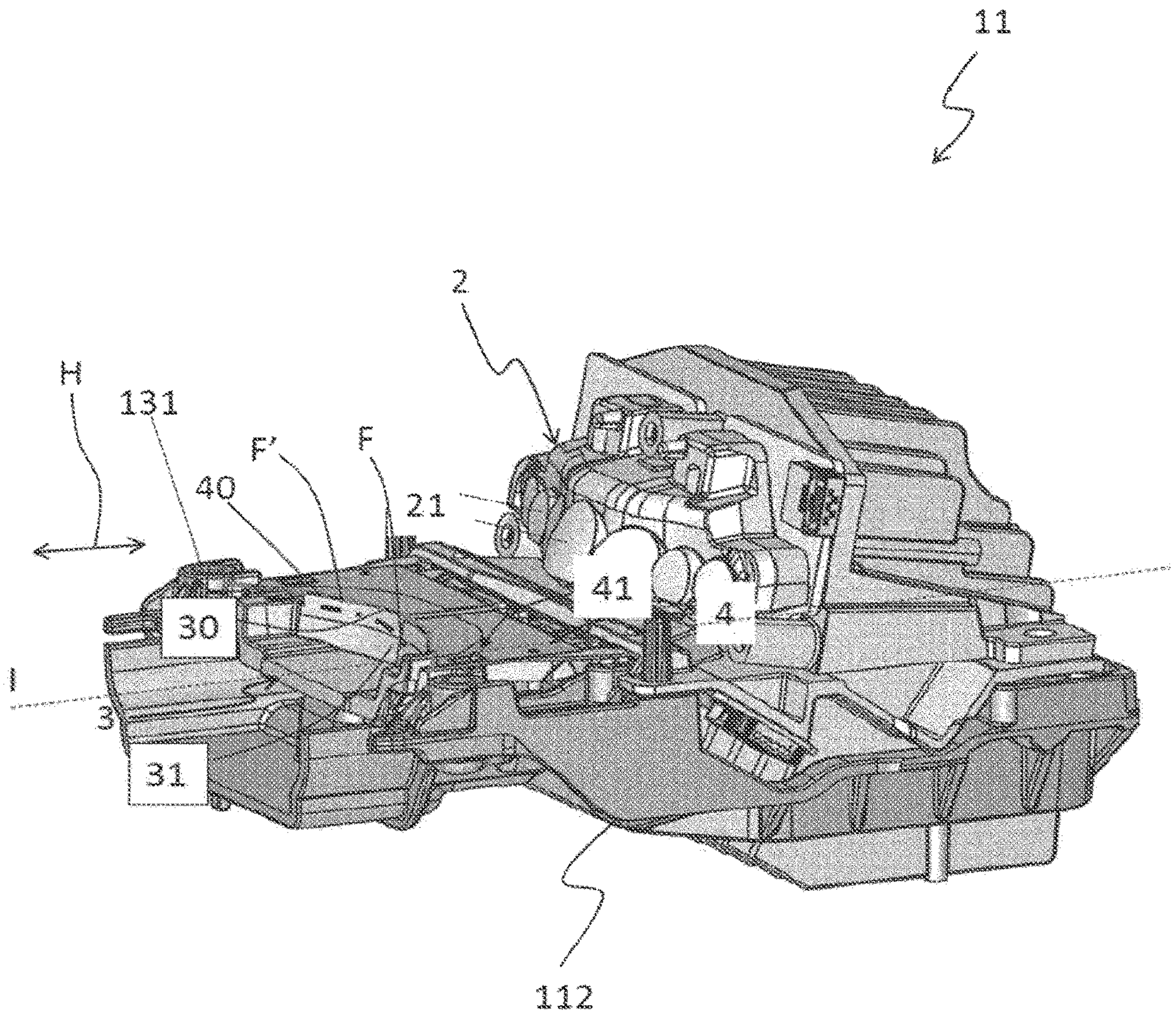
FIG. 13 is the same view as FIG. 5, but without the upper chassis.

According to the invention and as illustrated in FIG. 13, the first subassembly 11 comprises a first member 2 generating rays of light and a second member 3 generating rays of light, these being referred to hereinafter as first member 2 and second member 3, respectively. The first member 2 is situated above the second member 3.

The first subassembly 11 further comprises a reflection member 4 arranged between the two members 2 and 3. In other words, the first member 2 is arranged on one side of the reflection member 4, and the second member 3 on the other side. The reflection member 4 here is in the form of a thin metal plate comprising a downstream edge 40 and a reflective face 41 facing upward.

In this example, the first member 2 is able to form a beam with a cut-off performing the function of a headlamp low beam.

The first member 2 comprises, in this instance, light sources, notably light-emitting diodes (LEDs) and collimators 21 positioned in front of said light sources. The first member 2 and the reflection member 4 are arranged one relative to the other in such a way that said reflection member 4 forms a beam-bender for the rays emanating from the first member 2.

Specifically, some of the light rays emanating from the first member 2 pass level with the downstream edge 40 of the reflection member 4. The rays of light in that part are parallel to the optical axis I on exiting the convergent lens 120 and form the cut-off line of the headlamp low beam.

The downstream edge 40 is also referred to as the cut-off edge 40. In addition, given that said cut-off edge 40 is connected to the first member 2, it will be referred to hereinafter as the first cut-off edge 40.

At the same time, another part of the rays of light emanating from the first member 2 is reflected by the reflective face 41 of the reflection member 4 toward the convergent lens 120. The rays of light of said other part exit the lens 120 along an axis secant with the optical axis I and are projected below the first cut-off line.

As for the second member 3, this is able to form a beam that complements the low beam generated by the second member 2 so that the combination of said complementary beam and the low beam forms a high beam.

The second member 3 here comprises a plurality of light guides (not visible in FIG. 14). Each light guide comprises an inlet diopter and an outlet. A light source is placed facing each inlet diopter.

The light guides are arranged so that the rays of light originating from the light sources propagate inside the guides by total internal reflection in the longitudinal direction X, upstream to downstream, i.e. in the direction from the inlet diopter toward the outlet.

The second member 3 further comprises a common outlet 31 located downstream of the outlets of the light guides. The common outlet 31 in this case forms a front face of the second member 3, through which face the rays of light exit said member 3. The common outlet 31 is delimited at the top by an upper edge 30.

In the second member 3, part of the rays of light pass via the upper edge 30 and exit parallel to the optical axis I of the convergent lens 120. The rays of light of said part form the cut-off line of the beam of light generated by the second member 3. The other rays of light that do not pass via the upper edge 30 are projected above the cut-off line. The upper edge 30 is referred to hereinafter as the second cut-off edge 30.

Here, the reflection member 4 is in edge-to-edge contact with the second member 3 so that the first cut-off edge 40 touches the second cut-off edge 30 along the entire length. In addition, the thickness of the reflection member 4 is very small. Viewed from the outside, the first and second cut-off edges 40 and 30 appear to form one single cut-off edge.

Thus, the cut-off line for the beam of light generated by the first member 2 is identical to the cut-off line for the beam of light generated by the second member 3. In addition, when the first and second members 2 and 3 are illuminated at the same time, said cut-off lines coincide on the projection, and this allows better meeting of the beams generated by said members.

In order for the rays of light passing via the first cut-off edge 40 and via the second cut-off edge 30 to exit parallel to the optical axis I of the lens 120, said lens 120 has a focal plane F situated in the vicinity of the first and second cut-off edges 40 and 30.

However, the lens 120 may still sometimes exhibit chromatic aberration. This problem is illustrated here by the fact that the first and second cut-off edges 40 and 30 are situated in the “red” focal plane F'. The effect of this is that the cut-off line for the beam of light is of a color close to red, which impairs the quality of said beam, and makes it non-compliant with the regulations in the field of vehicle lighting.

Likewise, when the first and second cut-off edges 40 and 30 are situated in the “blue” focal plane (which is not illustrated in FIG. 13), the cut-off line for the beam of light may have a color close to blue. This is undesirable because the color blue impairs the visual comfort of the beam of light and carries a risk of non-compliance with the regulations.

The projection assembly 1 is able to overcome this problem. Indeed, by virtue of the connecting system 13 and the guidance systems 14 and 15, the first subassembly 11 can be moved with respect to the second subassembly 12 in the longitudinal direction X so that the cut-off edges 30 and 40 are close to the optimal focal plane F, making it possible to mute the color of the cut-off line to a large extent or even cause this color to disappear.

Said movement is represented by the double-headed arrow H and may be the subject of a step of a method for adjusting the projection assembly 1 in order to obtain a beam of light of good visual quality and free of irregularities caused by chromatic aberration.

The adjusting method may comprise first of all a first step during which a beam of light emitted by the projection assembly 1 is projected onto a surface at a distance from said assembly 1. Said surface may be a surface of a screen placed in front of the projection assembly 1. The distance between the screen and the projection assembly may be comprised between 1 m and 2 m.

Note that the beam emitted by the projection assembly 1 may be the low beam generated by the first member 2, the complementary beam generated by the second member 3, or the beam resulting from combining said low beam and said complementary beam. According to one exemplary embodiment, during the adjusting method, the beam emitted by the projection assembly 1 is the low beam generated by the first member 2.

During this first step, the first subassembly 11 has its movement relative to the second subassembly 12 blocked, notably when the screw 133 is in the screw-down locked position.

Next comes the second step of the method during which step the visual appearance of the projection of the beam of light is evaluated. This evaluation notably comprises a detection of color on the projection. The detection may be performed by a visual-check system notably comprising optical sensors known to those skilled in the art.

If a color in the list of unauthorized colors, and referred to as a forbidden color, is detected on the projection of the beam of light, the beam is considered to be non-compliant. The method then moves on to the third step of unblocking the first subassembly 11 with respect to the second subassembly 12. In this instance, the third step involves loosening the screw 133 so that it is in the screw-up unlocked position.

Thereafter, during a fourth step, the first subassembly 11 is moved translationally with respect to the second subassembly 12 and/or the second subassembly 12 is moved translationally with respect to the first subassembly 11 in the longitudinal direction X. The movement may involve moving the subassemblies 11 and 12 closer together or farther apart.

In a fifth step, the visual appearance of the beam of light is evaluated once again. The same evaluation operations as in the second step are repeated in this fifth step.

At the end of this new evaluation, if the beam of light still exhibits chromatic aberrations, the method moves on to a sixth step during which the two subassemblies 11 and 12 are moved once again relative to one another.

By contrast, if, after the evaluation step, no forbidden color is detected by the sensors, relative movement of the first subassembly 11 and of the second subassembly 12 is blocked by re-tightening the screw 133 until it reaches the screw-down locked position.

In the example illustrated, during the fourth step and the sixth step, which is to say during the movement of the subassemblies 11 and 12 along the optical axis I, the translational movement of the first subassembly 11 and of the second subassembly 12 relative to one another in the transverse direction Y and the vertical direction Z is blocked. Furthermore, during these steps, rotation of the first subassembly 11 with respect to the second subassembly 12 about the transverse axis J is likewise blocked.

As explained hereinabove, the actions of blocking rotational and translational movements are achieved by the translational-guidance system 14 and the anti-rotation guidance system 15.

In another example, the translational-guidance system 14 and the anti-rotation guidance system 15 may be transferred onto an adjusting device which is suitable for carrying out the adjusting method described hereinabove. This makes it possible to simplify the structure of the projection assembly 1. For example, the adjusting device may comprise translation-blocking and rotation-blocking members which perform the same functions as said systems 14 and 15.

Moreover, by way of example, the adjusting device may comprise a first support and a second support. The first and second supports need to be able to move one relative to the other in the longitudinal direction X. For example, two said supports may be mounted on a slideway extending in the longitudinal direction X. The supports may thus slide in the slideway.

In addition, when the projection assembly is placed in the adjusting device, the first subassembly 11 is mounted in the first support, while the second subassembly 12 is mounted in the second support. The first and second supports of the adjusting device are positioned relative to one another in such a way as to be able to maintain the connection between the first subassembly 11 and the second subassembly 12, namely in such a way as to keep the screw 133 engaged both in the bore 131 and in the orifice 132.

The adjusting device may further comprise an adjusting member for manipulating the screw 133. The adjusting member may notably be an arm fitted with a screwdriver head compatible with the head of the screw 133. Thus, said adjusting member is able to play a part in the step of blocking and/or the step of unblocking the first subassembly 11 with respect to the second subassembly 12.

In one example, the adjusting device may be automated. It notably comprises a central control unit connected to the first support, to the second support and to the adjusting member. The adjusting device may also comprise the visual-check system which performs the step of evaluating the visual appearance in the method described. In that case, the visual-check system is also connected to the central control unit.

Thus, the central control unit is able to direct some of the operations during the steps of the adjusting method. For example, the central control unit receives the information from the visual-check system and, on the basis of this information, the central unit activates the adjusting member so that it loosens the screw 133. The central unit may also command the relative movement of the first support and the second support one with respect to the other.

Such an adjusting device thus allows the creation of an adjusting method that is quick and reliable.

The invention claimed is:

1. A projection assembly projecting a beam of light along an optical axis, the projection assembly comprising:

a first subassembly configured to generate rays of light;

a second subassembly comprising a convergent lens; and a connecting system connecting the first subassembly to the second subassembly and allowing a translational movement of the first subassembly and the second subassembly relative to each other in a first direction parallel to the optical axis, wherein the first subassembly and the second subassembly are configured such that the rays of light emanating from the first subassembly are sent toward the convergent lens and that the rays of light leaving said convergent lens form the beam of light, wherein the connecting system comprises a locking member able to move between a first position in which the first subassembly and second subassembly are immobile relative to one another, and a second position allowing said translational movement.

2. The projection assembly as claimed in claim 1, wherein:

the connecting system comprises a bore made in one of the first subassembly or the second subassembly, and an orifice that is elongated in the first direction and made in the other of the first subassembly or the second subassembly, the bore and the orifice being positioned facing one another, and the locking member comprises a screw inserted into the bore and into the orifice and able to move between the first position in which the screw clamps the first subassembly and the second subassembly against one another so as to immobilize the first subassembly and the second subassembly relative to each other, and the second position in which the screw is loosened so as to allow relative movement of the first subassembly and the second subassembly.

3. The projection assembly as claimed in claim 1, further comprising an end stop limiting an amplitude of the translational movement in the first direction of the first subassembly and the second subassembly relative to each other.

4. The projection assembly as claimed in claim 1, further comprising two connecting systems each arranged on a respective side of the optical axis symmetrically about the optical axis.

5. The projection assembly as claimed in claim 1, further comprising a translational-guidance system arranged in such a way as to block the translational movement of the first subassembly and of the second subassembly relative to each other in a second direction transverse to the first direction.

6. The projection assembly as claimed in claim 5, wherein the translational-guidance system comprises a stud produced on one of the first subassembly or the second subassembly, and a slot made in the other of the first subassembly or the second subassembly, said slot extending in the first direction and being arranged in such a way that a width of the slot, measured in the second direction, is substantially equal to a transverse dimension of the stud in the second direction and that the slot is arranged in such a way as to allow the stud to slide in the slot in the first direction.

7. The projection assembly as claimed in claim 1, further comprising an anti-rotation guidance system arranged in such a way as to block rotation of the first subassembly with respect to the second subassembly about a transverse axis that is transverse to the first direction.

8. The projection assembly as claimed in claim 7, wherein the anti-rotation guidance system comprises a finger borne by one of the first subassembly or the second subassembly, and a bearing surface arranged on the other of the first subassembly or the second subassembly, the bearing surface extending in the first direction and the finger bearing against the bearing surface in such a way that the bearing surface blocks a movement of the finger in one sense of a third direction perpendicular to the first direction and orthogonal to the transverse axis.

9. The projection assembly as claimed in claim 8, wherein the anti-rotation guidance system comprises two of said bearing surfaces each arranged on a respective side of the finger in a third direction that is transverse to the first direction and the second direction.

10. The projection assembly as claimed in claim 9, wherein;

the anti-rotation guidance system comprises a groove comprising a bottom extending in a first plane parallel to the first direction and to the third direction and two sides extending from the bottom and in a second plane perpendicular to the first plane, and the two of said bearing surfaces are each arranged on a respective side of the two sides.

11. A vehicle headlamp comprising the projection assembly as claimed in claim 1.

12. A method for adjusting the projection assembly as claimed in claim 1, said method comprising projecting the beam of light emitted by said projection assembly onto a surface at a distance from said projection assembly, the first subassembly being blocked in terms of movement with respect to the second subassembly;

evaluating a visual appearance of the beam of light projected onto the surface;

if the beam of light is non-compliant, unblocking the first subassembly with respect to the second subassembly in terms of movement;

moving the first subassembly with respect to the second subassembly and/or moving the second subassembly with respect to the first subassembly, translationally in the first directions;

evaluating once again the visual appearance of the beam of light projected onto the surface if the beam of light is non-compliant, once again moving the first subassembly with respect to the second subassembly and/or moving the second subassembly with respect to the first subassembly, translationally in the first direction; and if the beam of light is compliant, blocking the first subassembly with respect to the second subassembly in terms of movement.

13. The adjusting method as claimed in claim 12, wherein:

unblocking the first subassembly with respect to the second subassembly comprises adjusting the locking member into the second position, and blocking the first subassembly with respect to the second subassembly comprises adjusting the locking member into the first position.

14. The adjusting method as claimed in claim 12, wherein;

when moving the first subassembly with respect to the second subassembly and/or moving the second subassembly with respect to the first subassembly translationally in the first direction, the translational movement of the first subassembly and of the second subassembly relative to each other is blocked in at least one direction selected from the group consisting of a second direction and a third direction, the second direction is transverse to the first direction, and the third direction is transverse to the first direction and to the second direction.

15. The adjusting method as claimed in claim 12, wherein when moving the first subassembly with respect to the second subassembly and/or moving the second subassembly with respect to the first subassembly translationally in the first direction, rotation of the first subassembly with respect to the second subassembly about a transverse axis that is transverse to the first direction is blocked.

16. An adjusting device for implementing the adjusting method as claimed in claim 12, the adjusting device comprising:

a first support configured to accept the first subassembly of the projection assembly; and a second support intended to accept the second subassembly of the projection assembly, wherein the first support and the second support are arranged in such a way as to be able to move translationally relative to each other in the first direction and maintain connection between said first subassembly and said second subassembly.

17. The adjusting device as claimed in claim 16, further comprising an end stop limiting an amplitude of the translational movement of the first subassembly and of the second subassembly relative to each other in the first direction.

18. The adjusting device as claimed in claim 16, further comprising:

a translational blocking member arranged in such a way that, when the projection assembly is placed in said adjusting device, the translational movement of the first subassembly and of the second subassembly relative to each other is blocked in at least one direction selected from the group consisting of a second direction and a third direction, the second direction is transverse to the first direction, and the third direction is transverse to the first direction and to the second direction.

19. The adjusting device as claimed in claim 16, further comprising a rotation-blocking member arranged in such a way that when the projection assembly is placed in said adjusting device, rotation of the first subassembly with respect to the second subassembly about a transverse axis, which transverse to the first direction, is blocked.

20. The adjusting device as claimed in claim 16, further comprising an adjusting member configured to adjust the locking member into the first position or into the second position.

21. The adjusting device as claimed in claim 16, further comprising:

a visual-check system for visually checking the beam of light emitted by the projection assembly; and a central control unit connected to the first support, to the second support and to said visual-check system, wherein said central control unit is configured to command relative movement of the first support and of the second support according to a signal from the visual-check system.

* * * * *